Figure 5:
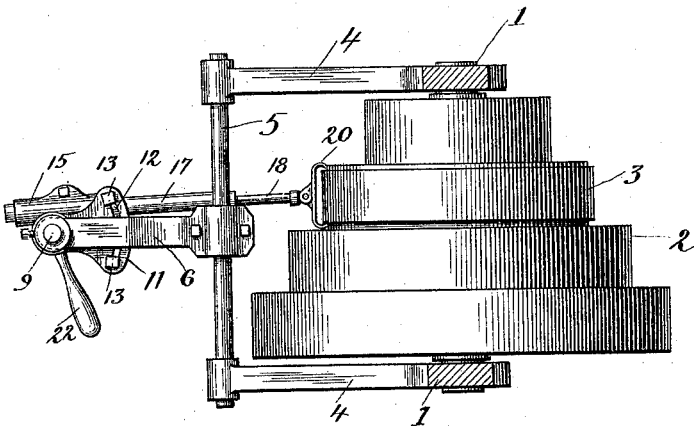

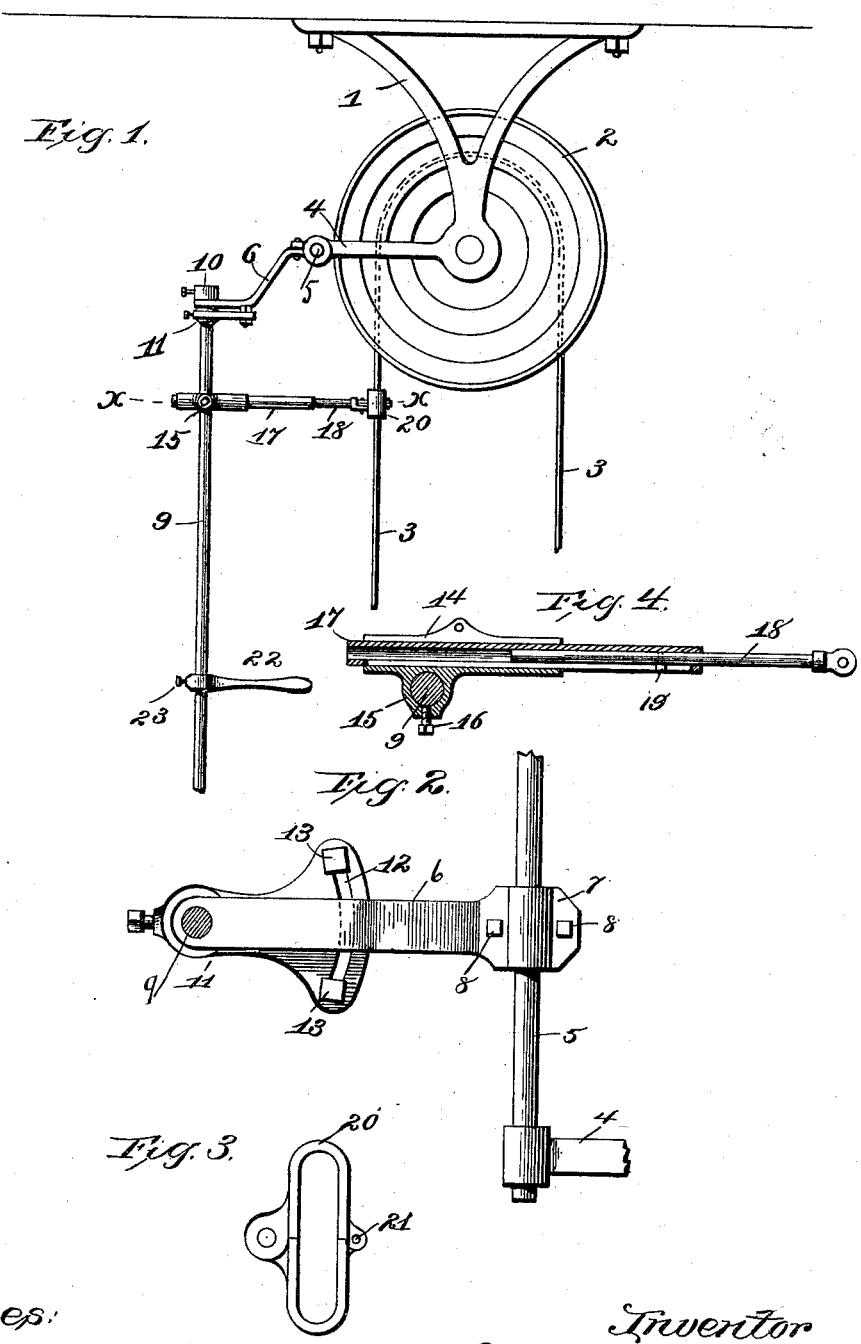

(No Model.) 2 Sheets—Sheet 2.

P. H. PRATT.
BELT SHIFTER.

No. 555,735. Patented Mar. 3, 1896.

Witnesses:
H. B. Hallock,
J. J. Williamson

Inventor:
Prescott H. Pratt
by Geo. H. Holgate
Attorney

UNITED STATES PATENT OFFICE.

PRESCOTT H. PRATT, OF EAST BRIDGEWATER, MASSACHUSETTS.

BELT-SHIFTER.

SPECIFICATION forming part of Letters Patent No. 555,735, dated March 3, 1896.

Application filed October 22, 1895. Serial No. 566,504. (No model.)

*To all whom it may concern:*

Be it known that I, PRESCOTT H. PRATT, a citizen of the United States, residing at East Bridgewater, in the county of Plymouth and State of Massachusetts, have invented certain new and useful Improvements in Cone Belt-Shifters, of which the following is a specification.

My invention relates to a new and useful improvement in cone belt-shifters, and has for its object to provide such a device that will permit the operator to change a belt from one pair of cones to another of different size without having to handle the belt or stop the machinery.

With these ends in view my invention consists in the details of construction and combination of elements hereinafter set forth and then specifically designated by the claims.

In order that those skilled in the art to which this invention appertains may understand how to make and use the same, I will describe its construction and operation in detail, referring by numbers to the accompanying drawings, forming a part of this specification, and in which—

Figure 1 is an elevation of one or a pair of cone-pulleys, showing my improved shifter arranged in operative position relative thereto; Fig. 2, an enlarged broken-away view of the sustaining-bracket and stop-bracket; Fig. 3, a detailed view of the shifter-loop; and Fig. 4, a section on the line $x$, showing the position of the shipper-arm within its tube. Fig. 5 is a top plan view showing my improvement applied.

Similar numbers denote like parts in all the views of the drawings.

With the machinery in common use great difficulty has been experienced in changing a belt from one pair of cones to another of different size, and the usual mode of accomplishing this result has been to place the hand upon one side of the belt and force it from the larger pulley onto the next smaller, and then run the other portion of the belt upon the larger cone on the opposite pulley; but this is often attended with great danger, sometimes resulting in a serious accident to the operator, and in heavy machinery it is almost impossible to thus shift a belt, which necessitates the stopping of the machine for the purpose; but by the use of my improvement the belt may be shifted from one cone to another, either a smaller diameter or larger, as readily as from a tight to a loose pulley.

1 represents a hanger of any desired construction, in which is journaled one of a pair of cone-pulleys 2, it being understood that the other member of a pair is placed upon any ordinary machine which is to be operated by the belt 3, and extending outward from each of the hangers is an arm 4, having a hole in its outer end through which is supported the rod 5, and bolted to this rod is the supporting-bracket 6, by means of a cap 7 and bolts 8. Passing through the outer end of the bracket 6 is the shipper-rod 9, which is retained in said bracket by means of a suitable collar 10, secured upon its upper end, and the shipper-rod is prevented from being displaced upwardly by a stop-bracket 11, which serves as a collar beneath the bracket 6. The stop-bracket is enlarged at its free end and has a slot 12 formed therein in which stop-bolts 13 are adjacently secured and adapted to strike against the supporting-bracket 6, so as to limit the axial movement of the shipper-rod 9, for the purpose hereinafter set forth.

14 is a socket having an offset 15 formed thereon, through which the shipper-rod 9 passes, and said socket is held upon the shipper-rod by the set-screw 16. 17 is a tube slotted upon one side and adapted to be clamped within the socket 14, and 18 is the shipper-arm, fitted so as to slide within its tube and having a lug or key 19, adapted to slide within the slot of said tube, so as to prevent the shipper-arm from turning upon its axis. Secured to the outer end of the shipper-arm is a split loop 20, so arranged as to be swung open when it is desired to place it around a belt and then closed and secured by a cotter-pin passing through the ears 21. 22 is a handle, secured by set-screw 23 to the shipper-rod, for operating the same.

From the foregoing description the operation of my improvement will be obviously as follows: The device having been placed in the position just described, with the loop 20 inclosing one side of the belt, when it is desired to shift said belt from one pair of cones to another the handle 22 is operated in the desired direction, by which means the shipper-rod is turned upon its axis until the belt is forced off one pair of cones onto the next adjacent thereto. Thus it will be seen that the belt is so guided that it is impossible for it to escape being forced to the next pair of cones. The stop-bolts 13, coming in contact with the supporting-bracket, will prevent the belt being thrown off the extreme ends of the cone. The shipper-arm during the rotary motion of the shipper-rod is free to move back and forth in its tube, which will compensate for the increasing and decreasing distance between the belt and the shipper-rod.

One of the great advantages of my present improvement is that no alteration is necessary in the hangers or their parts, the present fittings for cone-pulleys, in order to adapt my shipper thereto, as the hangers 1, of the usual construction used in connection with tight and loose pulleys where the belt is to be shifted from one to the other on the rod 5, is that which is used in connection with said hangers, so that to place my device in position upon such hangers and in connection with the cone-pulleys carried thereby it is only necessary to clamp the supporting-bracket to the rod 5, swing open the loop 20, and close the belt therein and secure said loop, as before described, when the device is ready for operation.

I am aware that slight modifications may be made in the construction herein shown without departing from the spirit of my invention, which rests in the broad idea of supporting a shipping-rod from a bracket secured to the ordinary hangers and providing said shipping-rod with means for controlling the belt upon a pair of cone-pulleys.

Having thus fully described my invention, what I claim as new and useful is—

1. In a device of the character described, a supporting-bracket, a rod to which the bracket is secured, arms within which the rod is held, a shipper-rod secured within the supporting-bracket and adapted to turn therein, a stop-bracket bolted to said shipper-rod and adapted to limit the axial movement thereof, a socket also bolted to said shipper-rod, a tube secured in said socket, a shipper-arm adapted to slide within said tube, and divided loop secured to the outer end of the shipper-rod and adapted to move the belt, as and for the purpose described.

2. In combination, a supporting-bracket, a shipper-rod adapted to turn within said supporting-bracket, a stop-bracket adapted to limit the movement of this shipper-rod, a socket secured to the shipper-rod, and a tube held therein, a shipper-arm adapted to slide within said tube and prevent it from turning upon its axis by the lug 19, sliding in a slot within said tube, a divided loop adapted to inclose the belt, and the handle 22 for operating the device, as and for the purpose described.

In testimony whereof I have hereunto affixed my signature in the presence of two subscribing witnesses.

PRESCOTT H. PRATT.

Witnesses:
S. S. WILLIAMSON,
BENJ. W. KEITH.